A. P. SUNDT.
AUTOMATIC SPRING PACKING.
APPLICATION FILED APR. 27, 1910.
963,406.
Patented July 5, 1910.
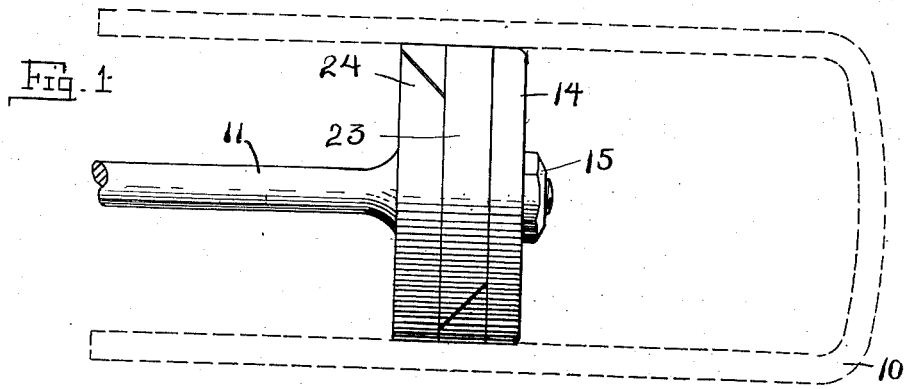
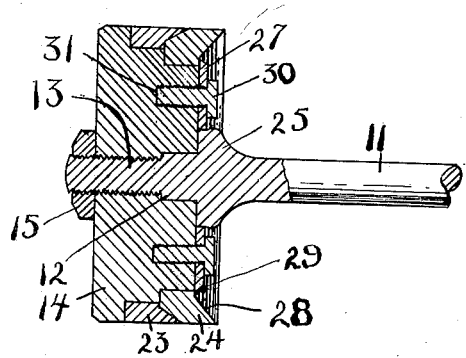
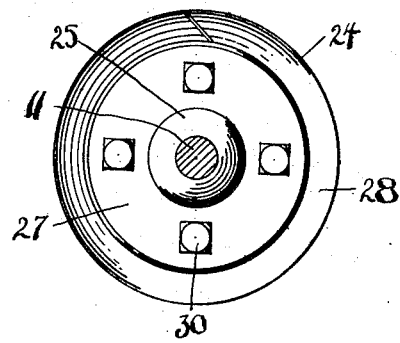
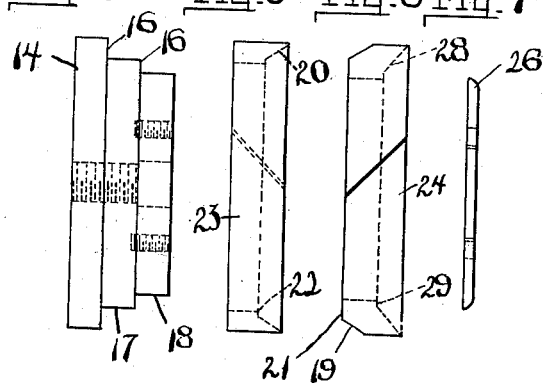
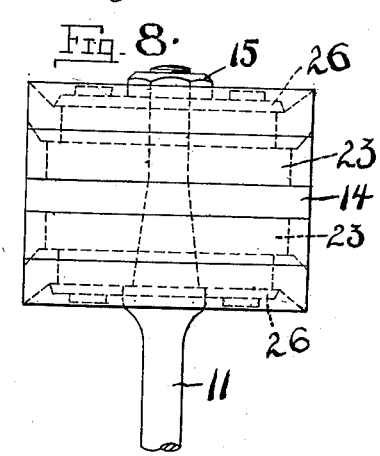

UNITED STATES PATENT OFFICE.

ALFRED P. SUNDT, OF STOUGHTON, WISCONSIN.

AUTOMATIC SPRING-PACKING.

963,406. Specification of Letters Patent. Patented July 5, 1910.

Application filed April 27, 1910. Serial No. 557,933.

*To all whom it may concern:*

Be it known that I, ALFRED P. SUNDT, a citizen of the United States of America, residing at Stoughton, in the county of Dane and State of Wisconsin, have invented certain new and useful Improvements in Automatic Spring-Packings, of which the following is a specification, reference being had therein to the accompanying drawing.

This invention relates to improvements in automatic spring packings and is more especially designed for use in connection with hydraulic presses.

An object of this invention is the provision of a plurality of resilient packing members arranged to encircle a member which it is desired to position either liquid or fluid tight with reference to a member within which the same is adapted to reciprocate.

Broadly speaking these objects are accomplished by the mechanisms described and provision being had whereby an increase in pressure in either direction upon the longitudinal axis of the movable member results in a wedging action between the several spring members for forcing the same more tightly against the containing body.

A further essential feature in connection with the automatic expansion of the packing elements is the provision of a jointed structure for each consisting of a slight spacing apart of the opposite ends of each member and upon a line at an angle to the longitudinal axis of the packed member, while at the same time the joint of each member is formed in an opposite direction and positioned at a different point upon the periphery of said packed member.

With these general objects in view and others that will appear as the nature of the invention is better understood, the improvement consists in the novel combination, and arrangement of parts as hereinafter fully described, illustrated in the accompanying drawings and pointed out in the appended claims.

In the drawings forming a part of this application and in which like designating numerals refer to corresponding parts throughout the several views: Figure 1 is a side elevation of a piston rod and head provided with my invention and showing the same operatively positioned within a cylinder casing, which latter is shown in dotted lines. Fig. 2 is a central transverse section of the piston head shown in Fig. 1. Fig. 3 is an end view of the piston head taken from the direction of the piston rod. Fig. 4 is a side elevation of the piston head body. Fig. 5 is a side view of the inner packing ring detached. Fig. 6 is a side view of the outer packing ring detached. Fig. 7 is a side view of the outer securing plate, and, Fig. 8 is a side view of the piston head showing the double packing members employed in opposed relations.

Referring in detail to the drawings, the cylinder 10 is shown in dotted lines and represents the cylinder or casing of any motor such as a hydraulic press of a steam engine and in which in the ordinary manner the piston rod 11 is adapted to reciprocate. The end of the piston rod being provided with an unthreaded portion 12 and terminating in an exteriorly-threaded portion 13 is adapted to receive the piston head body or block member 14 which is secured thereon in any desired manner, for instance, by the use of a lock nut 15. The outer periphery of said head is stepped forming two shoulders 16 and reduced peripheral faces 17, 18 of differing diameters and each being of less diameter than that of the head at its greatest diameter.

There is provided for seating upon one of the shoulders 16 a spring ring or packing 23 as shown in Fig. 5 which is in the form of an annulus having a central opening substantially equal to the diameter of the face 17 and adapted to fit thereover. For reception upon the face 18 and the shoulder 16 thereof is a second spring packing ring 24 as shown in Fig. 6 which at its inner face is provided with a beveled peripheral portion 19 adapted to fit within the annular socket 20 of said first-named packing member 23, while the inner annular face 21 seats upon the annular shoulder 22 thereof.

Encircling the piston rod and provided with a perforation for receiving the enlargement 25 thereof is an outer cover plate 26 as shown in Fig. 7. The outer packing member 24 being provided with an inclined inner annular face 28 terminating in a seat 29 is adapted to receive and position said cover plate upon said latter named seat while the hold-fast devices 30 are adapted to secure said plate to the head by being screw-threaded within sockets 31 of the piston head body.

The members 23 and 24 consist of annular encircling rings and are preferably constructed of a resilient or spring metal, such as spring brass for allowing slight expansion thereof to afford a close packing between the same and the inner periphery of the receiving cylinder, said packing members consisting of split rings in which the severance between the parts thereof is positioned at an angle to the longitudinal axis of the piston head and rod while the plane of such split is in opposite directions in the several packing members and when positioned upon the head, preferably break joints by assuming spaced positions upon the periphery of said head.

The general operation of the device is believed to be apparent to anyone conversant with the art but briefly set forth consists in positioning the separate rings and cover plate upon the piston head block which is secured to the end of the piston rod, all as hereinbefore fully set forth.

The forced reciprocation of the piston head in either direction results in forcing the two packing members 23 and 24 together with the wedging surfaces 19 and 20 thereof in close contact, one with the other, which wedging action tends to force the leading ring outwardly by the action of the follower ring and thus automatically spring-pressing the packing against the inner periphery of the containing cylinder.

While the forms of the invention herein shown and described are what are believed to be the preferable embodiments thereof, it is nevertheless to be understood that changes may be made in the proportion, size and minor details of construction without departing from the spirit and scope of the invention as set forth in the appended claims.

I claim:

1. A device of the class described comprising a piston head having a plurality of annular exterior integral right angular seats and each seat being of a differing diameter, separate resilient packings adapted to be received upon said seats, said packings provided with slanting coöperating annular wedging faces an annular seat provided upon each packing, a cover plate secured to said head and positioned upon the seat of one of said packings and one packing abutting upon the seat of a contiguous packing.

2. A device of the class described comprising a piston head having a plurality of peripheral faces and each face being of a differing diameter, separate resilient packings adapted to be received upon said faces, said packings provided with coöperating annular wedging faces, a cover plate secured to said head and adapted to retain said packings in position, said packings being severed and forming interrupted ends and such ends of each separate packing positioned to break joints with each other and positioned at spaced points upon the periphery of the piston head.

In testimony whereof I affix my signature in the presence of two witnesses.

ALFRED P. SUNDT.

Witnesses:
 THOS. INGEBRETSEN,
 JOHN THOMPSON.